S. WHITING.
SPRING FRAME FOR MOTOR CYCLES AND LIKE MACHINES.
APPLICATION FILED JULY 29, 1914.
1,154,821.
Patented Sept. 28, 1915.
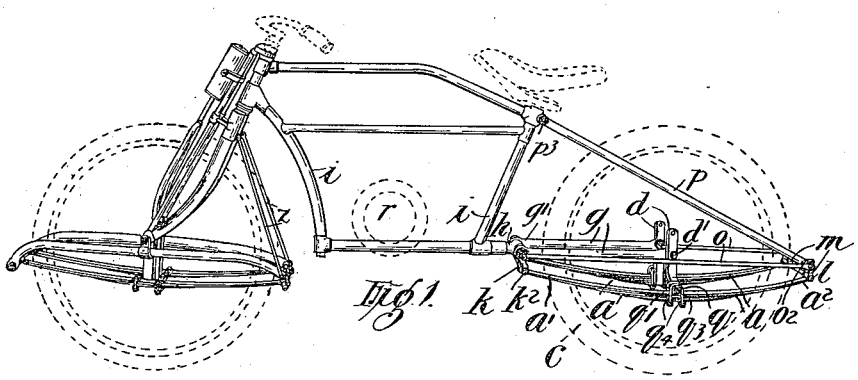
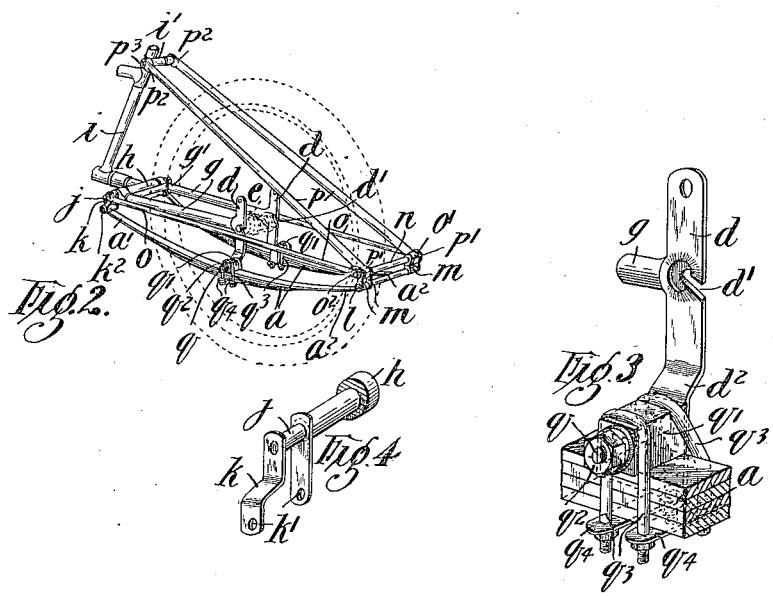
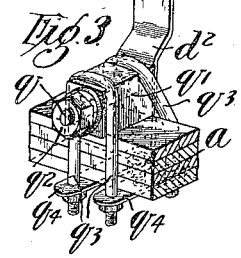
Witnesses:—
Charles B Crompton
May G. Luttrell
S. Whiting.
Inventor.
By Geroydon Marks
Attorney.

UNITED STATES PATENT OFFICE.

SAVILLE WHITING, OF ST. KILDA, VICTORIA, AUSTRALIA.

SPRING-FRAME FOR MOTOR-CYCLES AND LIKE MACHINES.

1,154,821.  Specification of Letters Patent.  Patented Sept. 28, 1915.

Application filed July 29, 1914. Serial No. 853,884.

*To all whom it may concern:*

Be it known that I, SAVILLE WHITING, a subject of the King of Great Britain, residing at Glencoe, Canterbury Road, St. Kilda, in the State of Victoria, Australia, have invented certain new and useful Improvements in Spring - Frames for Motor - Cycles and like Machines; and I do declare the following to be a full, clear, and exact description of the invention, such as will enable others skilled in the art to which it appertains to make and use the same.

This invention relates to spring mounting for the rear wheels of motor cycles and like machines of the type in which the wheel axle is carried in slottted plates clamped to and supported by semi-elliptic laminated leaf springs. Hitherto, the ends of such springs have been connected by shackles or the like to rigid parts of the machine frame, while the clamps on the springs have themselves been carried by a pivotally mounted rear fork. There is, however, the drawback that owing to the connection between the clamp and rear fork being rigid and the fork moving in the arc of a circle, a distortion of the elliptic form of the spring results, so that its total capacity is not utilized.

The object of the present invention is to prevent the distortion referred to, to utilize the full capacity of the spring, and impart a better degree of resiliency to the mounting for the rear wheel.

According to the present invention a pivotal connection is provided between the clamp attached to the spring, and the axle carrying member on the rear fork, whereby the clamp may always adjust itself to any position of the fork and thus exert an equalized effort on the spring.

The invention also comprises further details of construction hereinafter fully described and claimed.

In order that my invention may be the more easily understood, reference may be made to the accompanying drawings, in which:—

Figure 1 illustrates a side view of a motor cycle embodying my invention; Fig. 2 is a view of the back spring frame detached; Fig. 3 is a view drawn to an enlarged scale of a clamping device hereinafter described, while Fig. 4 represents an illustration of the shackle for the rear spring hereinafter to be referred to.

I would have it understood that all engine parts, belt drive fittings, brake gear, etc., have been omitted from the drawings for sake of clearness, such parts having no direct reference to the invention.

In a frame embodying my invention I employ a camber leaf spring $a$ on each side of the back wheel $c$. Said springs $a$ lie parallel with the plane of the rear wheel and are supported by hanging slotted rectangular plates $d$ (see Fig. 3). In the upper portion of these plates is mounted the axle $e$ of the wheel $c$. The plates $d$ are preferably but not necessarily integral with a main horizontal fork $g$ the latter at its other end $g'$ being centered and radially workable on a cross member $h$, the latter being a part of the main frame $i$ of the machine. A pin $j$ passes through the parts at $g'$ and $h$ and upon its projecting ends a shackle $k$ depends (see Figs. 1, 2 and 4). Through the bottom of the shackle $k$ are perforations $k'$ through which a bolt $k^2$ passes and forms a pivot or hinge pin for the forward ends $a'$ of the camber springs $a$. The rear ends $a^2$ of the springs $a$ are similarly supported by a pin $l$ passing through links as $m$ (see Figs. 1 and 2.) The links $m$ depend from a corresponding parallel pin $n$ the said latter pin, after passing through the upper portion of links $m$, projecting sufficiently to enable them to receive the bifurcated ends $o'$ and $o^2$ of straining or torque rods $o$. These rods run in parallel arrangement to the forward part at $h$ where they encircle the pin $j$ and are kept in position by a lock nut at each end.

$p$ (see Figs. 1 and 2) are diagonal stay tubes or rods mounted at their back ends $p'$ on the cross pin $n$ and at their tops $p^2$ to a cross pin $p^3$ set upon a cross member $i''$ of the frame $i$ of the machine.

Reverting to the slotted rectangular plates $d$ (see Figs. 1, 2 and 3), slots $d'$ are provided to receive the ends of the axle $e$ and permit the removal of the axle pin and wheel when the latter requires to be retired, convenient bolts and washers being arranged for the purpose. The lower portion of $d$ extends outwardly at $d^2$ and has a rectangular rocker pin $q$ formed upon it (see Figs. 1, 2 and 3) and surrounding the said rocker pin $q$ is a loose bearing block $q'$ kept in position on the pin by nut and washer $q^2$. The spring $a$ depends from this block $q'$ and is held by clips $q^3$ and bottom plates $q^4$.

It will be seen that when the spring $a$ work resiliently during the travel of the machine a certain amount of radial play or rock is permitted by reason of the rocker pin $q$ and that an expanding movement is also allowed for at the ends $a'$ and $a^2$ of such springs by reason of the corresponding rocking of the depending links $m$.

The engine and all its parts are conveniently placed (as shown in dotted lines at $r$).

Having thus described my invention what I claim as new and desire to secure by Letters Patent is:—

1. A spring suspension for the rear wheels of motor cycles and like machines comprising in combination a pivotal rear fork, bearing members at the free end thereof for the wheel axle, a pair of laminated leaf springs, clamps attached to said springs, means connecting the clamps to the pivotal fork, a pair of rear stays, and means for securing the ends of the laminated springs to the main frame of the machine and rear stays respectively.

2. A spring suspension for the rear wheels of motor cycles and like machines comprising in combination, a pivotal rear fork, bearing members at the free end thereof for the wheel axle, a pair of laminated leaf springs, clamps attached to the said springs, a pivotal connection between the clamps and bearing members, a pair of rear stays, and means for securing the ends of the laminated springs to the main frame of the machine and rear stays respectively.

3. A spring suspension for the rear wheels of motor cycles and like machines comprising in combination, a pivotal rear fork, bearing members at the free end thereof for the wheel axle, a pair of laminated leaf springs, clamps attached to the said springs, a pivotal connection between the clamps and bearing members, a pair of rear stays, means for securing the ends of the laminated springs to the main frame and rear stays respectively and straining rods pivoted at one end to the main frame and at the other to the end of the rear stays.

4. A spring suspension for the rear wheels of motor cycles and like machines comprising in combination a pivotal rear fork, slotted bearings at the free ends thereof for the wheel axle, a pair of laminated leaf springs, a rocker pin extending from each slotted bearing, a rocking block upon each rocker pin and resting on each spring, means for clamping together each spring and its rocking block, a pair of rear stays, means for securing the ends of the laminated springs to the main frame and rear stays respectively and straining rods pivoted at one end to the main frame and at the other to the end of the rear stays.

In testimony whereof I have signed my name to this specification in the presence of two subscribing witnesses.

SAVILLE WHITING.

Witnesses:
ALICE HARKER,
DOROTHY L. SMITH.

Copies of this patent may be obtained for five cents each, by addressing the "Commissioner of Patents, Washington, D. C."